United States Patent [19]

Fujii et al.

[11] Patent Number: 4,491,855

[45] Date of Patent: Jan. 1, 1985

[54] IMAGE RECORDING METHOD AND APPARATUS

[75] Inventors: Haruo Fujii; Yujiro Ando, both of Yokohama, Japan

[73] Assignee: Canon Kabushiki Kaisha, Tokyo, Japan

[21] Appl. No.: 416,051

[22] Filed: Sep. 8, 1982

[30] Foreign Application Priority Data

Sep. 11, 1981 [JP] Japan ........ 56-143205
Nov. 26, 1981 [JP] Japan ........ 56-190032

[51] Int. Cl.[3] ........ G01D 15/06
[52] U.S. Cl. ........ 346/159
[58] Field of Search ........ 346/153.1, 159; 101/DIG. 13

[56] References Cited

U.S. PATENT DOCUMENTS 3,081,698 3/1963 Childress et al. ........ 346/159 X
3,413,654 11/1968 Strong ........ 346/159
3,689,935 9/1972 Pressman et al. ........ 346/159
4,357,618 11/1982 Ragland ........ 346/159

*Primary Examiner*—Thomas H. Tarcza
*Attorney, Agent, or Firm*—Fitzpatrick, Cella, Harper & Scinto

[57] ABSTRACT

A method and apparatus utilizing a controller having a plurality of openings or slit-like openings to control the passage of charged particles and to record a visible image by the charged particles directly on an image receiving member. The present invention is an improved device for supplying the charged particles to a control electrode and has made high-speed and stable recording possible. The improvement lies in that the charged particles are supported on a supporting member and an alternating electric field is applied between the supporting member and the control electrode. Thus, it has become possible to sufficiently supply the charged particles to the control electrode without scattering them.

9 Claims, 10 Drawing Figures

IMAGE RECORDING METHOD AND APPARATUS

BACKGROUND OF THE INVENTION

1. Field of the Invention

This invention relates to an image recording method and apparatus utilizing an electric field generated in or near a number of independent row-like openings or slit-like openings. The electric field generated in the openings and used in the present invention is formed by applying an electrical signal to the electrodes of a control member. The present invention also relates to a technique in which, by the electric field generated in the openings, a charged particulate developer (hereinafter simply referred to as the toner), such as charged toner particles or charged ink, is modulated and a visible image is formed on an image receiving member.

2. Description of the Prior Art

A direct recording technique of this type has been proposed in U.S. Pat. No. 3,689,935. This method utilizes as a control member two electrodes provided with an insulating layer interposed therebetween and formed with a row of apertures (the control member of this type will hereinafter be referred to as the apertured board). This method and controls the passage of the charged toner by the apertured borad to obtain an image by the passed toner on an image receiving member provided on the opposite side from a toner supply source. However, in this method of the prior art, supply of the toner to the control member is not uniformly effected and irregularities are liable to occur in the image on the image receiving member. High-speed recording is difficult and moreover, the openings in the apertured board are liable to be clogged by the toner. For these reasons, this method has not yet been put into practical use.

SUMMARY OF THE INVENTION

It is an object of the present invention to eliminate the above-noted disadvantages peculiar to the prior art and to stabilize the supply of the toner and provide a method and apparatus which make stable image formation possible for a long period of time.

The present invention which achieves the above object conveys the toner to control means while holding it on a toner supporting member and forms an alternating electric field between the control means and the toner supporting member, thereby supplying the toner to the control means.

The invention will become fully apparent from the following detailed description thereof taken in conjunction with the accompanying drawings.

DESCRIPTION OF THE PREFERRED EMBODIMENTS

The invention will hereinafter be described with respect to some embodiments thereof and with reference to the drawings.

Figure 1A:
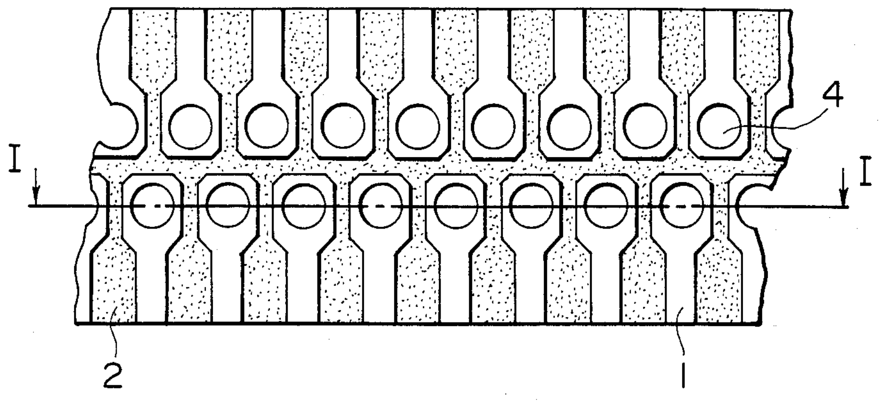
FIG. 1A is an enlarged plan view of toner control means usable in the present invention.
Figure 1B:
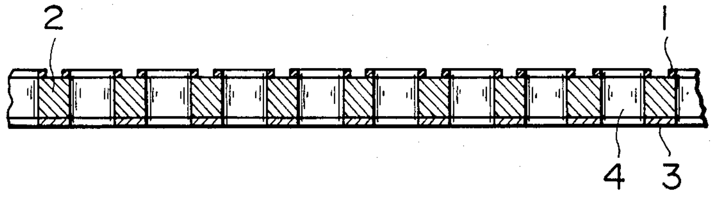
FIG. 1B is a cross-sectional view taken along line I—I of FIG. 1A.
Figure 2:
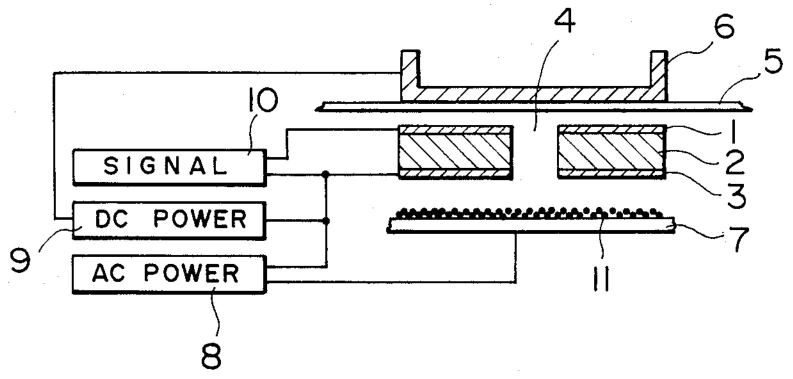
FIG. 2 illustrates the principle of toner modulation.
Figure 3:
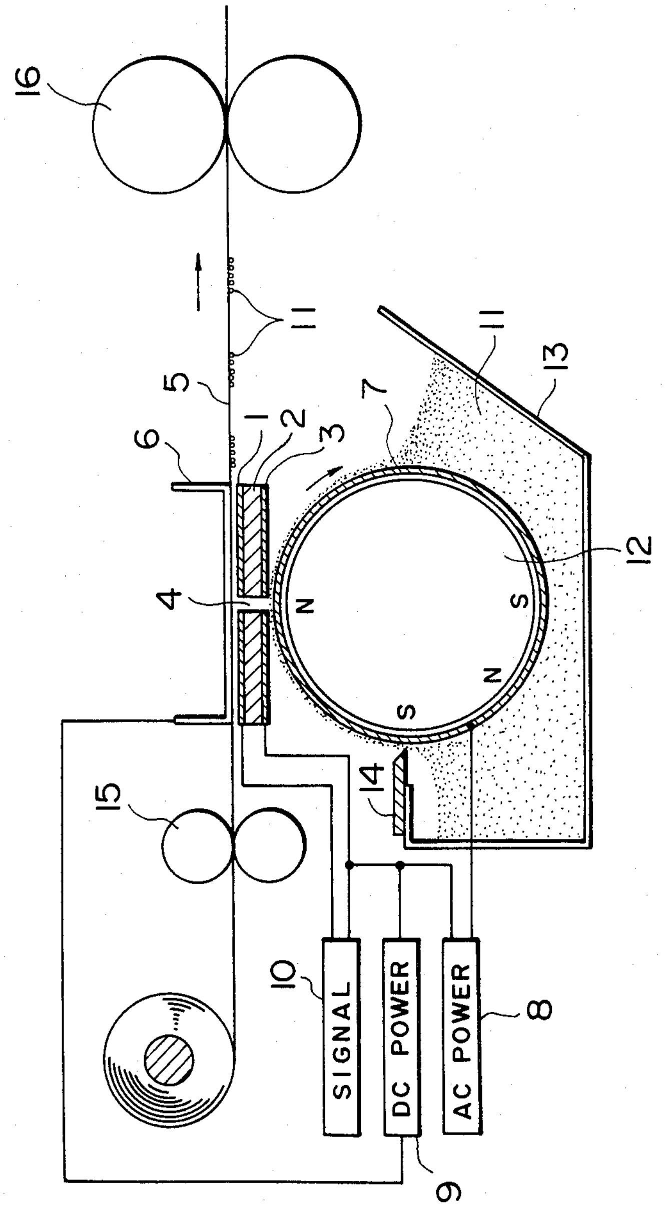
FIGS. 3 and 4 are cross-sectional views showing an embodiment of the present invention.

FIG. 1A is a plan view showing the construction of a control member applicable to the present invention, FIG. 1B is a cross-sectional view taken along line I—I of FIG. 1A, FIG. 2 illustrates the basic operation of the present invention, and FIG. 3 is a cross-sectional view showing another embodiment of the present invention.

Referring to FIGS. 1A and 1B, reference numeral 1 designates signal electrodes to which voltages may be independently and individually applied, reference numeral 3 denotes base electrodes which continuously span distances between a plurality of holes, and reference numeral 2 designates insulating members electrically insulating the signal electrodes 1 and the base electrodes 3. Designated by 4 are holes forming openings which extend through the signal electrodes 1, the base electrodes 3 and the insulating members 2 with the same cross-sectional area.

The basic operation of the present invention will now be described with reference to FIG. 2. In FIG. 2, reference numeral 6 designates a back electrode and reference numeral 5 denotes an image receiving member which is in intimate contct with the back electrode 6. Reference numeral 7 denotes a toner conveying member formed of a non-magnetic material, and reference numeral 11 designates a one-component insulative magnetic toner uniformly applied onto the toner conveying member 7. The control member described in connection with FIGS. 1A and 1B is disposed between the back electrode 6 and the toner conveying member 7, with the back electrode 6 and the signal electrodes 1 opposed to each other, and the toner conveying member 7 and the base electrodes are opposed to each other. Designated by 8 is an AC power source connected to the base electrodes 3 and the toner conveying member 7. Denoted by 9 is a DC power source connected to the back electrode 6 and the base electrodes 3. Reference numeral 10 designates a signal power source connected to the signal electrodes 1 and the base electrodes 3.

In the above-described construction, when an AC voltage or a DC-biased AC voltage is applied between the base electrodes 3 and the toner conveying member 7 by the AC power source 8, the toner 11 on the toner conveying member 7 formed of an electrically conductive material moves between the base electrodes 3 and the toner conveying member 7. When, at such time, a voltage is applied to the signal electrodes 1 and the base electrodes 3 from the signal power source 10, the moving toner 11 passes through the openings 4 and is attracted to the signal electrodes 1. Further, a DC voltage is applied between the back electrode 6 and the base electrodes 3 by the DC power source 9 and therefore, the toner 11 is further accelerated and adheres to the image receiving member 5.

When there is no signal voltage applied to the signal electrodes 1 and the base electrodes 3 from the signal power source 10 or when a reverse electric field is being applied thereto, the moving toner does not pass through the openings 4. Also, as the toner reciprocally moves between the base electrodes 3 and the toner conveying member 7 due to the action of the AC voltage, at the same time, the control member is rubbed by the reciprocally moving toner and this provides a control member cleaning effect. When a signal is applied to the signal electrodes 1 in the form of an image as previously described, the image is formed as a toner image on the surface of the image receiving member 5, whereafter this toner image is fixed on the image receiving member 5 by heating or pressing.

When the polarity of the toner particles 11 has a negative (−) charge, the polarity of the voltage supplied from the signal power source 10 is made negative (−) to the base electrodes 3 and positive (+) to the signal electrodes 1 and the polarity of the voltage supplied from the DC power source 9 is made negative (−) to the base electrodes and positive (+) to the back electrode 6. The ground potential may be taken anywhere, and usually the base electrodes are grounded. When the polarity of the toner 11 is positive (+), the aforementioned polarities will be reversed.

FIG. 3 which shows the construction of an embodiment of the present invention will hereinafter be described. In FIG. 3, reference numerals identical to those in FIG. 2 signify identical elements. In FIG. 3, the image receiving member 5 is in intimate contact with the back electrode 6, and this image receiving member in the form of a roll is driven in the direction of arrow at a predetermined speed by a driving system, not shown. The gap between the back electrode 6 and the signal electrodes 1 can be set to a range of 100 microns to 10 mm. In the present embodiment, the gap is about 300μ and a DC voltage of 300 V is applied between the back electrode 6 and the base electrodes 3 from the DC power source 9. The electric field between the back electrode 6 and the base electrodes may suitably be 500–1500 V per 1 mm. The signal electrodes 1 and the base electrodes 3 are maintained at an interval of 50μ by an insulating material and these elements have been designed such that a DC voltage of 50 V can be applied as a signal voltage only to the location necessary for character generation from the signal power source 10. As previously described, the control member has been provided with openings 4 having a diameter of 140 μm so that the insulative magnetic toner can pass through the base electrodes 3, the signal electrodes 1 and the insulating members 2.

These openings 4 have a center width of 250 μm and they can be arranged in staggered relationship as shown in FIG. 1. For example, when the width of the image receiving member 5 is 297 mm, 2,376 openings 4 have been provided in the control member in the direction of the width of the recording member and the respective signal electrodes 1 are independently connected to the signal power source 10. Designated by 12 is a fixed magnet placed in the hollow cylinder of the toner conveying member 7 formed of a non-magnetic material such as aluminum alloy, stainless steel or brass. Reference numeral 13 designates a toner container, and reference numeral 14 denotes a blade of magnetic material used to uniformly apply the insulative magnetic toner 11 onto the toner conveying member 7.

The spacing between the toner conveying member 7 and the base electrodes 3 may suitably be 100–500 microns and, to improve the recording speed, it may preferably be narrow in such a range that the toner is not pressed and condensed. In the present embodiment, this spacing is 200 microns and the AC voltage applied therebetween has an actual effective value of 300 V and 4.5 KHz.

When, under the above-described conditions, the toner conveying member 7 having a diameter of 32 mm has been rotated at 150 rpm, the insulative magnetic toner 11 within the toner container 13 has adhered onto the toner conveying member 7 while being attracted by the fixed magnet 12 and further, the magnetic toner 11 could be uniformly applied onto the toner conveying member 7 by the blade 14 of magnetic material. When, in this condition, a necessary signal pulse is applied from the signal power source 10 to the signal electrodes 1 while the image receiving member 5 is moved at 250 mm/sec. in the direction of arrow, the magnetic toner 11 has adhered well onto the image receiving member 5 and there has been formed thereon a character or a figure corresponding to the signal pulse. The magnetic toner 11 having thus adhered onto the recording member 5 is fixed on the recording member 5 by pressure fixation by rollers 16.

In the above-described embodiment, there has been shown an example in which the modulated toner is fixed directly on the image receiving member 5, but it is of course possible to transfer and fix the toner image onto another image receiving member under the electric field of a corona discharger or the like and to reuse the image receiving member 5 which has initially received the toner. This will be an effective method where the use of a paper sheet as the image receiving member prevents the spacing between the control member and the image receiving member from being accurately maintained.

When a non-magnetic toner is used as the toner, an electrically conductive substrate having the surface thereof provided with a brush or concavo-convexity may be used as the toner conveying member and the toner may be carried and conveyed by the brush or the concavo-convexity. When a two-component developer is used, a thin layer of toner may be formed on the toner conveying member by bringing the two-component developer into contact with the toner conveying member with the aid of a conventional developing device such as, for example, a cascade magnetic brush or the like. By using such thin layer of toner, the two-component developer can be substantially regarded as a one-component toner and thus, there is obtained a result similar to that in the case of the one-component developer used in the present embodiment.

As described above, by an AC voltage being applied between the toner conveying member and the control member, and adhering force of the toner to the toner conveying member is weakened on the toner conveying member and as a result, recording becomes possible at a low applied voltage, thus minimizing the amount of consumed power. Further, if the apparatus is designed such that the toner itself contacts the control member when the toner reciprocally moves between the toner conveying member and the control member, this toner cleans the toner conveying member side. Therefore, the toner adheres to the openings only with difficulty and thus, it becomes possible to obtain stable images for a long period of time.

The toner used is not restricted to insulative toner but an electrically conductive magnetic or non-magnetic toner may also be used. In this case, the toner contacts the toner conveying member and the base electrodes of the control member and is charged to the polarity of the voltage applied to the two members. The charged toner reciprocally moves between the conveying member and the control member due to the alternating electric field formed between the two members.

Figure 4:
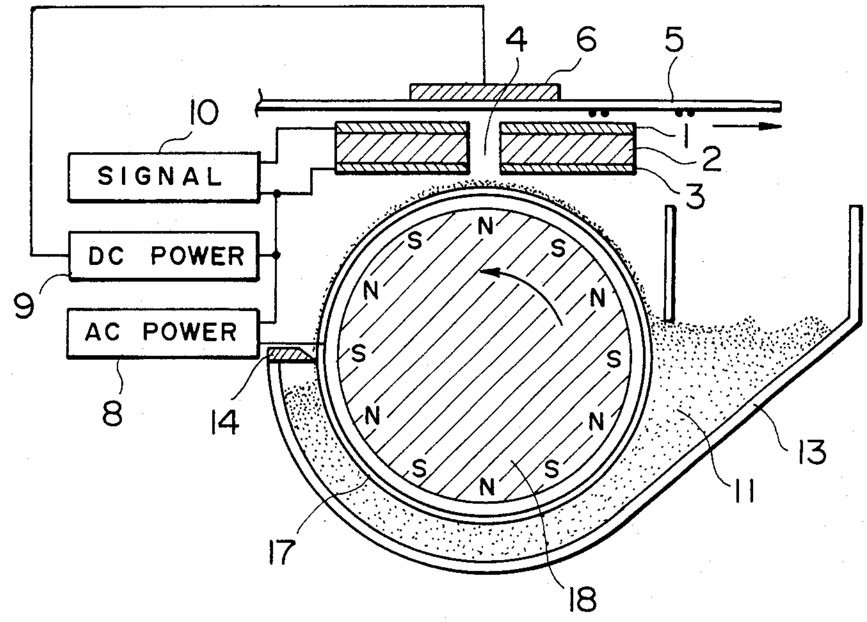

In FIG. 4 which shows another example in which the toner is conveyed to the control member, with members functionally identical to those of FIG. 3 being given identical reference numerals.

According to the present embodiment, the toner 11 in the toner container 13 is a one-component magnetic toner and is conveyed on a toner conveying member 17 in the direction opposite to the direction of rotation of a magnet 18 with the aid of the magnetic action of the magnet 18 rotated in the direction of arrow inside the toner conveying member 17 and alternately magnetized with magnetic poles of different polarities. The toner on the conveying member 17 is made into a uniform thin layer by the action of a doctor blade 14 and passes to the position of the control member.

The toner having reached the position of the control member is subjected to a force reciprocally moving between the electrodes 3 and the toner conveying member 17 due to the action of an AC electric field applied between the base electrodes 3 and the toner conveying member 17 from the AC power source 8. When, at this time, a voltage is applied to the signal electrodes 1, the toner is subjected to a force directed toward the signal electrodes 1 and passes through the openings 4 to the image receiving member. Designated by 9 is a DC power source. By a DC voltage being applied from the DC power source 9 to the base electrodes 3 and the back electrode 6, the toner is further accelerated by a DC electric field and adheres to the image receiving member 5 before it adheres to the signal electrodes 1.

Again in the above-described embodiment, the toner can be readily conveyed to the control member without being scattered and, due to the alternating electric field formed between the toner supporting member and the control member, the toner can be supplied to the control member without being scattered. Also, the toner reciprocally moving between the above-mentioned two members due to the alternating electric field lightly strikes the surface of the control member, and thus the toner is prevented from clogging the openings 4.

The diameter of the toner used is usually of the order of 10–20 μm and the diameter of the openings 4 is usually selected to the order of 100–300 μm. However, when condensation of the toner or admixture of rough foreign materials with the toner occurs during long use of the toner, the diameter of the toner may become approximately equal to the diameter of the openings 4. The toner whose diameter has become larger than the diameter of the openings 4 will adhere to the inner walls of the openings 4 to thereby clog these openings 4 and prevent a desirable result from being obtained.

Figure 5A:
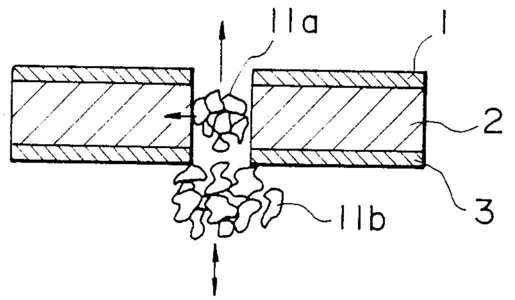
FIGS. 5A to 5C are cross-sectional views of the control opening of the control means.

FIG. 5A illustrates the phenomenon of enlarged toner clogging the openings 4 of the control member, and shows the neighborhood of an opening 4 in an enlarged cross-sectional view. In the control member shown, reference numerals identical to those in FIG. 1 signify identical elements. In FIG. 5A, reference numeral 11*a* designates the condensed toner having a diameter somewhat smaller than the diameter of the opening 4, and reference numeral 11*b* denotes the condensed toner having a diameter larger than the diameter of the opening 4.

Where the diameter of the opening 4 is 240 μm and for example, when the diameter of the condensed toner 11*a* is of the order of 200 μm, the condensed toner 11*a* contacts the wall of the insulating members 2 between the insulating members 2 and the signal electrodes 1 as it passes through the opening 4, thereby reducing its speed or generating an electrostatic power due to the friction thereof with the insulating members. As a result, the toner 11*a* stops its movement within the opening 4, thus clogging the opening 4.

Figure 5B:
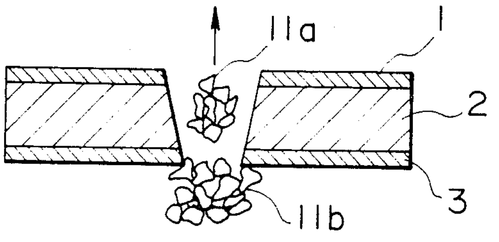

FIG. 5B is a cross-sectional view showing an example of the opening which is not clogged by the toner. In FIG. 5B, the openings 4 of the insulating members 2 and the signal electrodes 1 are continuously widened to prevent the toner 11*a* from contacting the inner wall of the openings 4. If the diameter ratio is made such that the ratio of the diameter of the base electrodes 3 to the diameter of the signal electrodes 1 is 1:1 to 1:2, it will be effective to prevent the clogging of the openings, but as a result of an experiment carried out with a maximum diameter of 350 μm, the clogging of the openings by the toner could most effectively be prevented.

Where the toner, like the condensed toner 11*b*, cannot pass through the openings 4, the condensed toner 11*b* is brought back to the toner conveying member 10 side by the AC electric field and does not clog the openings 4.

As described above, by making the diameter on the signal electrodes 1 side larger than the diameter on the base electrodes 3 side, the clogging of the openings 4 by the toner 11*b* can be prevented and thus, it has become possible to effect stable printing over a long period of time.

Such openings 4 can be formed on the basis of the shape of a drill used to form them.

Figure 5C:
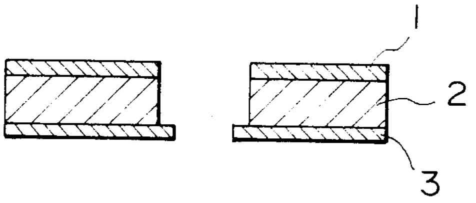

FIG. 5C shows another embodiment for preventing the openings 4 from being clogged by the toner. In this embodiment, the adherence of the condensed toner 11*a* to the inner wall of the openings 4 is reduced by making the diameters of the insulating members 2 and the signal electrodes 1 large relative to the diameter of the base electrodes 3 and making the diameters of the insulating members 2 and the signal electrodes 1 equal to each other.

In the embodiments of FIGS. 5B and 5C, it is possible to further enhance the clogging preventing effect by mixing a low surface energy substance such as Teflon with the insulating members forming the openings or by coating the wall of the openings 4 with the same substance.

As described above, by a simple structure in which the diameters of the openings of the insulating members 2 and the signal electrodes 1 are made larger than the diameter of the openings of the base electrodes 3, the influence of the condensed toner or foreign materials upon the openings 4 can be reduced so as to ensure that stable recording can be carried out.

Figure 6:
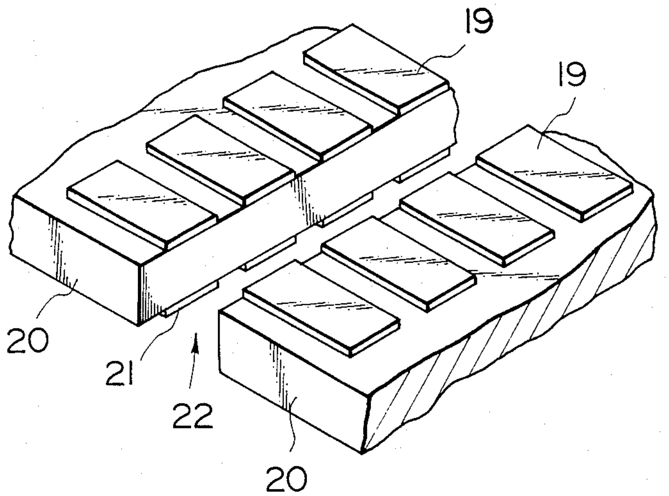
FIG. 6 is a perspective view showing another form of the control means.

Now, in the present invention, the control means may be not only means having a plurality of holes as openings but also may be control means having slit-like openings. FIG. 6 is a perspective view of control means having such slit-like openings 22. In FIG. 6, reference numeral 19 designates signal electrodes, reference numeral 20 denotes insulating members, and reference numeral 21 designates base electrodes. As the control means applicable to the present invention, there is means for producing an electric field in or near the openings and the control means is not restricted to any particular configuration.

Figure 7:
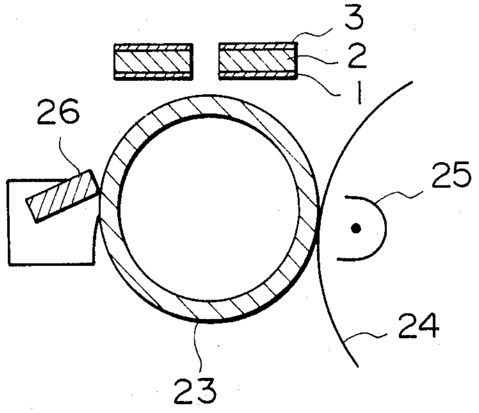
FIG. 7 is a cross-sectional view showing a modification of the image receiving member.

Furthermore, the image receiving member has been described as roll-like continuous paper or cut paper, but as shown in FIG. 7, an opposed electrode 23 may be used as the image receiving member and an image of insulative toner may be formed thereon. This toner image on the opposed electrode 23 may be transferred to another sheet-like image receiving member 24 under the electric field generated by a corona discharger 25 or the electric field generated by an electrode roller, whereafter the transferred toner image may be fixed by fixing means. In FIG. 7, reference numeral 26 designates a cleaning blade for removing any toner remaining on the opposed electrode.

The toner supporting member will now be described. If, as in the above-described embodiment, magnetic toner is used and conveyed under an electric field, the toner can be easily formed into a thin layer and the toner can be prevented from being scattered. However, if a fine charge pattern is formed on the surface of the insulative member and the toner is carried by a brush with planted hair on the order of 3–1 mm, the toner need not be magnetic.

Further, paying attention to the movement of the toner by the alternating electric field formed between the toner supporting member and the control member, the amount of movement of the toner between the two members can be adjusted by adjusting the frequency or the potential difference of the alternating electric field or any arbitrary conditions of the supporting member and the control member. That is, it becomes possible to make an adjustment as to whether the toner is positively brought into contact with the control member and at the same time to select the amount of toner to be supplied to the openings.

What we claim is:

1. An image recording method using control means having openings for controlling the passage of charged toner particles therethrough toward an image receiving member, said method comprising:

forming an electric field in the openings of said control means;

forming an electric field between said control means and said image receiving member;

supplying the charged toner particles to said control means while holding and conveying them with a supporting member; and producing an alternating electric field between said control means and said charged toner particle supporting member to cause said charged toner particles to move to said image receiving member under the influence of the electric field formed in the openings of said control means and the electric field formed between said control means and said image receiving member while causing said toner particles to reciprocally move between said supporting member and said control means, and thereby effecting recording.

2. An image recording method according to claim 1, wherein a magnetic toner is used as the charged toner particles and is attracted to the supporting member by magnetic force and thereby conveyed.

3. An image recording apparatus in which image recording is effected by controlling the passage of charged particles, said apparatus comprising:

control means formed with openings therein and having an electrode for controlling the passage of the charged particles by forming an electric field in said openings;

a charged particle supporting member for conveying the charged particles while holding them on the surface thereof to supply the charged particles to said control means;

means for forming an alternating electric field between said control means and said charged particle supporting member;

an image receiving member disposed with said control means lying between said image receiving member and said charged particle supporting member; and means for forming between said control means and said image receiving member an electric field which causes the charged particles to travel toward said image receiving member.

4. An image recording apparatus according to claim 3, wherein said charged particles are magnetic toner, and said supporting member includes a non-magnetic member and a magnetic field generating means mounted therein and endlessly movable relative to said magnetic field generating means.

5. An image recording apparatus according to claim 4, wherein said magnetic field generating means comprises a fixed roller having a plurality of magnetic poles and said non-magnetic member is a hollow drum rotatable around said roller.

6. An image recording apparatus according to claim 4, wherein said magnetic field generating means comprises a rotatable roller having a plurality of magnetic poles and said non-magnetic member comprises a hollow drum fixed around said roller.

7. An image recording apparatus according to claim 3, wherein said control means has a plurality of independent openings in the direction of the recording width.

8. An image recording apparatus according to claim 3, wherein said control means has slit openings extending in the direction of the recording width.

9. An image recording apparatus according to claim 3, wherein the openings of said control means are wider at the charged particle outlet side than at the charged particle inlet side.

* * * * *